(12) United States Patent
Fan

(10) Patent No.: US 9,341,763 B1
(45) Date of Patent: May 17, 2016

(54) BACKLIGHT MODULE AND LIQUID CRYSTAL DISPLAY DEVICE

(71) Applicant: Shenzhen China Star Optoelectronics Technology Co., LTD., Shenzhen,Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/420,374

(22) PCT Filed: Nov. 19, 2014

(86) PCT No.: PCT/CN2014/091692
§ 371 (c)(1),
(2) Date: Feb. 9, 2015

(30) Foreign Application Priority Data

Nov. 14, 2014 (CN) .......................... 2014 1 0648594

(51) Int. Cl.
*G02F 1/1333* (2006.01)
*F21V 8/00* (2006.01)
*F21K 99/00* (2016.01)

(52) U.S. Cl.
CPC ................ *G02B 6/0031* (2013.01); *F21K 9/56* (2013.01); *G02B 6/0026* (2013.01); *G02B 6/0073* (2013.01)

(58) Field of Classification Search
CPC .. G02B 6/0055; G02B 6/0045; G02B 6/0068; G02B 6/0088; G02B 6/0038; G02B 6/0036; G02B 6/0046; G02B 6/0021; G02F 1/133615; G02F 1/133603–1/133604; G02F 1/133608
USPC ................ 349/61, 65; 362/23.09, 23.16, 600, 362/602–603, 608, 610, 615, 628
See application file for complete search history.

(56) References Cited

U.S. PATENT DOCUMENTS

2006/0001037 A1\* 1/2006 Schardt ................ G02B 6/0008
257/98
2011/0141769 A1\* 6/2011 Lee ...................... G02B 6/0023
362/629

(Continued)

FOREIGN PATENT DOCUMENTS

CN 102937268 A 2/2013
WO WO2014132726 A1 9/2014

*Primary Examiner* — Anne Hines
*Assistant Examiner* — Jose M Diaz
(74) *Attorney, Agent, or Firm* — Andrew C. Cheng

(57) ABSTRACT

The present invention discloses a backlight module, which includes: a backplane, which has a sidewall; a light guide plate, which is carried on the backplane and includes a light incidence end section, a light exit surface, and a bottom surface opposite to the light exit surface; a light source, which is mounted on the sidewall and adjacent to the light incidence end section; an intermediate frame, which is set on and covers the light guide plate and the light source; a first retention slot, which is formed in the light incidence end section and has an opening facing the intermediate frame; a second retention slot, which is formed in the light incidence end section and close to the first retention slot and has an opening facing the backplane; a first quantum dot strip, which is received in the first retention slot; and a second quantum dot strip, which is received in the second retention slot. The present invention also discloses a liquid crystal display device. The present invention provides an arrangement including quantum dot strips arranged in the light incidence end section in a top-down staggering manner, where the manner of fixing is simple and light emitting from the light source is prevented from directly entering the light guide plate so as to improve the taste of the color of the backlighting.

20 Claims, 1 Drawing Sheet

(56) References Cited

U.S. PATENT DOCUMENTS

| | | | | |
|---|---|---|---|---|
| 2011/0304524 A1* | 12/2011 | Seen | ............ | H04M 1/22 345/55 |
| 2012/0113671 A1* | 5/2012 | Sadasivan | ............ | C09D 11/101 362/602 |
| 2013/0050612 A1* | 2/2013 | Hur | ............ | G02F 1/133603 349/62 |
| 2013/0128189 A1* | 5/2013 | Hu | ............ | G02B 6/0031 349/65 |
| 2014/0036536 A1* | 2/2014 | Gettemy | ............ | G02B 26/02 362/612 |
| 2015/0117052 A1* | 4/2015 | Hsu | ............ | G02B 6/0043 362/606 |
| 2015/0153508 A1* | 6/2015 | Mihara | ............ | G02F 1/133603 349/62 |
| 2015/0219822 A1* | 8/2015 | Lee | ............ | G02B 6/0023 362/608 |
| 2015/0234111 A1* | 8/2015 | Lee | ............ | G02B 6/0023 362/608 |
| 2015/0286096 A1* | 10/2015 | Kim | ............ | G02B 5/22 349/65 |
| 2015/0369988 A1* | 12/2015 | Hsu | ............ | G02B 6/005 349/61 |
| 2016/0070056 A1* | 3/2016 | He | ............ | G02B 6/0073 349/65 |

* cited by examiner

BACKLIGHT MODULE AND LIQUID CRYSTAL DISPLAY DEVICE

BACKGROUND OF THE INVENTION

1. Field of the Invention

The present invention relates to the field of liquid crystal displaying technology, and in particular to a backlight module and a liquid crystal display device.

2. The Related Arts

A conventional liquid crystal display device often uses a white light-emitting diode (LED) as a backlight source, which, when properly arranged in combination with a light guide plate and an optic film, could achieve desired backlighting for liquid crystal. With the increasing demands of people for high color gamut, high color saturation, and energy saving, the solutions that are conventionally adopted to achieve white light source, high color gamut, and high color saturation include: using a violet LED in combination with red, green, and blue phosphors; using a blue LED in combination with red and green phosphors; and using a blue LED together with a green LED and a red LED. All these solutions help increase color gamut, but they are difficult to put into practice and costs are high.

The quantum dot (QD) technique is a technique related to a structure of a semiconductor nanometer material that confines electrons in a predetermined range and is composed of extremely small crystals of chemical compounds having a size ranging 1-100 nm. In the QD technique, crystals of different sizes can be used to control light wavelength in order to achieve precise control of light color. Thus, QD materials are used in backlight modules and a light source of a high frequency spectrum (such as a blue LED) is used to replace the conventionally used white LED light source. Being irradiated by lights of high frequencies, the QDs can be excited to emit lights of different wavelengths. Adjusting the size of the QD material would allow for adjustment of the color of the combined light so as to satisfy the demand for backlighting of high color gamut liquid crystal display modules.

FIG. 1 shows a known backlight module that uses a quantum dot phosphor film. Referring to FIG. 1, a blue light-emitting diode (LED) 11 is arranged at a light incidence side surface of a light guide plate 12 and a quantum dot phosphor film 13 is arranged on a light exit surface of the light guide plate 12, wherein light emitting from the blue LED 11 is converted by the light guide plate 12 into planar light and is projected from the light exit surface of the light guide plate 12 to pass through the quantum dot phosphor film 13, where the blue light is converted into backlighting required for a liquid crystal display device. However, for a large-sized liquid crystal display device, the quantum dot phosphor film 13 must be formed as a large area and this requires an increased amount of quantum dot material. Further, coating of the quantum dot phosphor layer is subjected to severe requirement for uniformity and this leads to a high cost. Further, in the use of the quantum dot phosphor film 13, if the configuration of the optic film or the model number of the optic film is different, the light, which is subjected to improvement made by the optic film, after transmitting through the liquid crystal display panel, shows great variations in respect of color and brightness and thus, during the use of the quantum dot phosphor film 13, it is generally not allowed to change the optic film configuration, the optic film supplier, or the optic film model number. This imposes limitations to the flexibility and universality of use of the quantum dot phosphor optic film.

FIG. 2 shows another known backlight module that uses a quantum dot phosphor film. Referring to FIG. 2, a blue LED 21 is arranged at a light incidence side surface of a light guide plate 22 and a quantum dot phosphor is packaged in a glass tube to form a quantum dot phosphor contained glass tube 23, wherein the quantum dot phosphor contained glass tube 23 is disposed between the blue LED 21 and the light incidence side surface of the light guide plate 12. The blue LED 11 emits blue light that passes though the quantum dot phosphor contained glass tube 23 to irradiate the light incidence side surface of the light guide plate 12. However, adopting this solution requires a complicated manufacture of the quantum dot phosphor contained glass tube 23 and the cost is high. Further, the quantum dot phosphor contained glass tube 23 is susceptible to breaking.

SUMMARY OF THE INVENTION

To overcome the above problems of the prior art techniques, an object of the present invention is to provide a backlight module, which comprises: a backplane, which comprises a sidewall; a light guide plate, which is carried on the backplane and comprises a light incidence end section, a light exit surface, and a bottom surface opposite to the light exit surface; a light source, which is mounted on the sidewall and is adjacent to the light incidence end section; an intermediate frame, which is set on and covers the light guide plate and the light source; a first retention slot, which is formed in the light incidence end section and has an opening facing the intermediate frame; a second retention slot, which is formed in the light incidence end section and close to the first retention slot and has an opening facing the backplane; a first quantum dot strip, which is received in the first retention slot; and a second quantum dot strip, which is received in the second retention slot.

Further, the first retention slot and the second retention slot are arranged to be parallel to each other.

Further, the first retention slot has an end contacting an inner end of a bottom of the first retention slot and the first retention slot has an opposite end that is flush with the light exit surface.

Further, the second retention slot has an end contacting an inner end of a top of the second retention slot and the second retention slot has an opposite end that is flush with the bottom surface.

Further, the backlight module further comprises a first reflection layer, wherein the first reflection film layer is arranged on a side of the intermediate frame that faces the backplane; the first reflection film layer has an end positioned against the sidewall; and the first reflection film layer has an opposite end located between the intermediate frame and the light guide plate.

Further, the backlight module further comprises a second reflection layer, wherein the second reflection film layer is arranged on a side of the backplane that faces the intermediate frame and the second reflection film layer has an end positioned against the sidewall.

Further, the backlight module further comprises a light absorption layer, wherein the light absorption layer is arranged between the intermediate frame and the light guide plate and the light absorption layer has an end positioned against the opposite end of the first reflection film layer.

Further, the backplane comprises a plurality of raised blocks formed on a side thereof that faces the light guide plate, wherein the light guide plate is positioned on the raised blocks.

Further, the backlight module further comprises a reflector plate, wherein the reflector plate is arranged between the light guide and backplane and the reflector has an end positioned against an opposite end of the second reflection film layer.

Another object of the present invention is to provide a liquid crystal display device, which comprises a backlight module and a liquid crystal display panel that are arranged to oppose each other. The backlight module supplies displaying light to the liquid crystal display panel to allow the liquid crystal display panel to display images, wherein the backlight module is the backlight module described above.

The present invention provides that quantum dot strips are arranged in the light incidence end section of the light guide plate in a top-bottom staggering manner, where the manner of fixing is simple and light emitting from the light source is prevented from entering the light guide plate by directly transmitting through the light incidence end section of the light guide plate so as to improve the taste of the color of the backlighting supplied from the backlight module to the liquid crystal display panel.

BRIEF DESCRIPTION OF THE DRAWINGS

The above and other aspects, features, and advantages of an embodiment of the present invention will become more apparent from the following description given with reference to the attached drawings. In the drawings.

DETAILED DESCRIPTION OF THE PREFERRED EMBODIMENTS

Embodiments of the present invention will be described in detail with reference to the attached drawings. However, various different forms may be adopted to embody the present invention and the interpretation of the present invention should not be limited to the embodiments described herein. On the contrary, these embodiments are provided for the purposes of explaining the principle and practical applications of the present invention in order to allow other technical persons of the art field to realize various embodiments of the present invention, as well as various modifications fit for specific intended uses.

Figure 1:
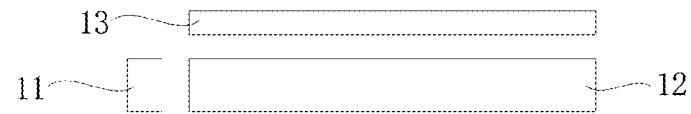
FIG. 1 shows a known backlight module that uses a quantum dot phosphor film.
Figure 2:
FIG. 2 shows another known backlight module that uses a quantum dot phosphor film.
Figure 3:
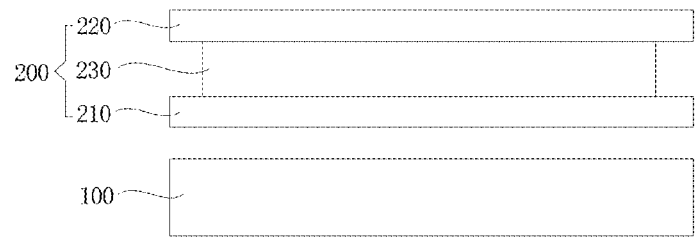
FIG. 3 is a schematic view showing a structure of a liquid crystal display device according to an embodiment of the present invention.

FIG. 3 is a schematic view showing a structure of a liquid crystal display device according to an embodiment of the present invention.

Referring to FIG. 3, the liquid crystal display device according to the embodiment of the present invention comprises a liquid crystal display panel 200 and a backlight module 100 that is arranged to oppose the liquid crystal display panel 200, wherein the backlight module 100 supplies displaying light to the liquid crystal display panel 200 to allow the liquid crystal display panel 200 to display images.

The liquid crystal display panel 200 commonly comprises a thin-film transistor (TFT) array substrate 210, a color filter (CF) substrate 220 that is opposite to the TFT array substrate 210, and a liquid crystal layer 230 interposed between the TFT array substrate 210 and the CF substrate 220, wherein the liquid crystal layer 230 comprises multiple liquid crystal molecules. Since a specific structure of the liquid crystal display panel 200 of the instant embodiment is virtually similar to structures of the conventional liquid crystal display panels, no further details will be given here.

A detailed description of a specific structure of the backlight module 100 according to an embodiment of the present invention will be given as follows.

Figure 4:
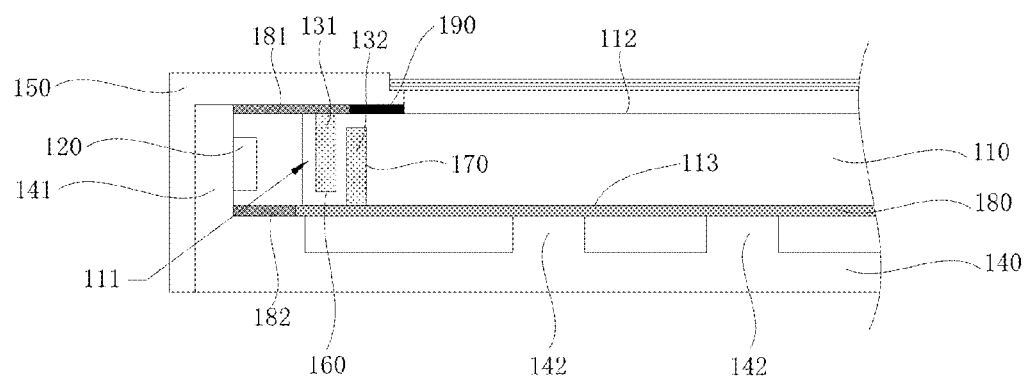
FIG. 4 is a schematic view showing a structure of a backlight module according to an embodiment of the present invention.

FIG. 4 is a schematic view showing a structure of a backlight module according to an embodiment of the present invention.

Referring to FIG. 4, the backlight module 100 according to the embodiment of the present invention comprises: a light guide plate 110, a light source 120, a quantum dot film strip (which will be briefly referred to as quantum dot strip hereinafter) 130, a backplane 140, an intermediate frame 150, a first retention slot 160, and a second retention slot 170.

Specifically, the backplane 140 comprises at least one sidewall 141. The light guide plate 110 is carried on the backplane 140 and comprises a light incidence end section 111, a light exit surface 112, and a bottom surface 113 opposite to the light exit surface 112, wherein the light incidence end section 111 faces the sidewall 141 of the backplane 140.

The light source 120 may be for example a light bar composed of blue light-emitting diodes (LEDs), which is mounted on the sidewall 141 of the backplane 140 and is adjacent to the light incidence end section 111 of the light guide plate 110. The intermediate frame 150 is set on and covers the light guide plate 110 and the light source 120.

A first retention slot 160 is formed in the light incidence end section 111 and has an opening facing the intermediate frame 150. A second retention slot 170 is formed in the light incidence end section 111 and close to the first retention slot 160 and has an opening facing the backplane 140. In the instant embodiment, preferably, the first retention slot 160 and the second retention slot 170 are arranged to be parallel to each other.

The first quantum dot strip 131 is received in the first retention slot 160. In the instant embodiment, preferably, the first quantum dot strip 131 has an end positioned against an inner wall of a bottom of the first retention slot 160 and the first quantum dot strip 131 has an opposite end that is flush with the light exit surface 112. The second quantum dot strip 132 is received in the second retention slot 170. In the instant embodiment, preferably, the second quantum dot strip 132 has an end positioned against an inner wall of a top of the second retention slot 170 and the second quantum dot strip 132 has an opposite end that is flush with the bottom surface 113.

The first quantum dot strip 131 and the second quantum dot strip 132 can be formed of, for example, a quantum dot phosphor layer and a transparent external protection layer that encloses the quantum dot phosphor layer. With the quantum dot phosphor layers of the first quantum dot strip 131 and the second quantum dot strip 132 being irradiated by the light source 120, the quantum dot phosphor layers are excited to generate different color lights so as to form white backlighting desired for the liquid crystal display panel.

Further, to improve light coupling efficiency, the backlight module 100 according to the embodiment of the present invention further comprises a first reflection layer 181, wherein the first reflection layer 181 is arranged on the side of the intermediate frame 150 facing the backplane 140. The first reflection layer 181 has an end positioned against the sidewall 141 of the backplane 140 and the first reflection film layer 181 has an opposite end that is located between the intermediate frame 150 and the light guide plate 110.

In addition, the backlight module 100 according to the embodiment of the present invention further comprises a second reflection layer 182, wherein the second reflection layer 182 is arranged on the side of the backplane 140 facing the intermediate frame 150 and the second reflection layer 182 has an end positioned against the sidewall 141 of the backplane.

In the instant embodiment, the first reflection layer 181 and the second reflection layer 182 may be made of metallic materials having high reflectance, such as silver; however, the present invention is not limited to this.

Further, to prevent light leakage from occurring between the intermediate frame 150 and the light guide plate 110, in the instant embodiment, the backlight module 100 according to the embodiment of the present invention further comprises a light absorption layer 190, wherein the light absorption layer 190 is arranged between the intermediate frame 150 and the light guide plate 110 and the light absorption layer 190 has an end that is positioned against said opposite end of the first reflection layer 181. The light absorption layer 190 can be for example a black film, but the present invention is not limited to this.

To improve overall heat dissipation of the backlight module 100, the backplane 140 can be made of a metallic material having excellent heat dissipation property and in the instant embodiment, the backplane 140 is made of aluminum. To further improve heat dissipation of components, such as the light guide plate 110, in the instant embodiment, the backplane 140 comprises a plurality of raised blocks 142 formed on a side thereof that faces the light guide plate 110. The second reflection layer 182 is arranged on one of the raised blocks 142 that is immediately adjacent to the sidewall 141 of the backplane 140. The light guide plate 110 is positioned on the raised blocks 142 and the light incidence end section 111 of the light guide plate 110 is positioned on the one of the raised blocks 142 that is immediately adjacent to the sidewall 141 of the backplane 140, so that the light guide plate 110 and the backplane 140 form therebetween a gap for further improving heat dissipation efficiency.

Further, the backlight module 100 according to the embodiment of the present invention further comprises a reflector plate 180, wherein the reflector plate 180 is arranged between the light guide plate 110 and the raised blocks 142 of the backplane 140 and the reflector plate 180 has an end positioned against an opposite end of the second reflection layer 182. The reflector plate 180 functions to reflect light exiting the bottom surface of the light guide plate 110 back into the light guide plate 110 in order to improve light utilization of the light guide plate 110.

In summary, according to the embodiments of the present invention, quantum dot strips are arranged in the light incidence end section of the light guide plate in a top-bottom staggering manner, where the manner of fixing is simple and light emitting from the light source is prevented from entering the light guide plate by directly transmitting through the light incidence end section of the light guide plate so as to improve the taste of the color of the backlighting supplied from the backlight module to the liquid crystal display panel.

Although a description of specific embodiment has been given to illustrate the present invention, those having ordinary skills of the art may appreciate that various variations in respect of forms and details can be made without departing the spirit and scope of the present invention that are only limited by the appended claims and the equivalents thereof.

What is claimed is:

1. A backlight module, comprising:
a backplane, which comprises a sidewall;
a light guide plate, which is carried on the backplane and comprises a light incidence end section, a light exit surface, and a bottom surface opposite to the light exit surface;
a light source, which is mounted on the sidewall and is adjacent to the light incidence end section;
an intermediate frame, which is set on and covers the light guide plate and the light source;
a first retention slot, which is formed in the light incidence end section and has an opening facing the intermediate frame;
a second retention slot, which is formed in the light incidence end section and close to the first retention slot and has an opening facing the backplane;
a first quantum dot strip, which is received in the first retention slot; and
a second quantum dot strip, which is received in the second retention slot.

2. The backlight module as claimed in claim 1, wherein the first retention slot and the second retention slot are arranged to be parallel to each other.

3. The backlight module as claimed in claim 1, wherein the first retention slot has an end contacting an inner end of a bottom of the first retention slot and the first retention slot has an opposite end that is flush with the light exit surface.

4. The backlight module as claimed in claim 1, wherein the second retention slot has an end contacting an inner end of a top of the second retention slot and the second retention slot has an opposite end that is flush with the bottom surface.

5. The backlight module as claimed in claim 1 further comprising a first reflection layer, wherein the first reflection film layer is arranged on a side of the intermediate frame that faces the backplane, the first reflection film layer having an end positioned against the sidewall, the first reflection film layer having an opposite end located between the intermediate frame and the light guide plate.

6. The backlight module as claimed in claim 1 further comprising a second reflection layer, wherein the second reflection film layer is arranged on a side of the backplane that faces the intermediate frame, the second reflection film layer having an end positioned against the sidewall.

7. The backlight module as claimed in claim 5 further comprising a light absorption layer, wherein the light absorption layer is arranged between the intermediate frame and the light guide plate and the light absorption layer has an end positioned against the opposite end of the first reflection film layer.

8. The backlight module as claimed in claim 1, wherein the backplane comprises a plurality of raised blocks formed on a side thereof that faces the light guide plate, wherein the light guide plate is positioned on the raised blocks.

9. The backlight module as claimed in claim 6 further comprising a reflector plate, wherein the reflector plate is arranged between the light guide and backplane and the reflector has an end positioned against an opposite end of the second reflection film layer.

10. The backlight module as claimed in claim 1 further comprising a reflector plate, wherein the reflector plate is arranged between the light guide plate and the backplane.

11. A liquid crystal display device, comprising a backlight module and a liquid crystal display panel that are arranged to oppose each other, the backlight module supplying displaying light to the liquid crystal display panel to allow the liquid crystal display panel to display images, wherein the backlight module comprises:
- a backplane, which comprises a sidewall;
- a light guide plate, which is carried on the backplane and comprises a light incidence end section, a light exit surface, and a bottom surface opposite to the light exit surface;
- a light source, which is mounted on the sidewall and is adjacent to the light incidence end section;
- an intermediate frame, which is set on and covers the light guide plate and the light source;
- a first retention slot, which is formed in the light incidence end section and has an opening facing the intermediate frame;
- a second retention slot, which is formed in the light incidence end section and close to the first retention slot and has an opening facing the backplane;
- a first quantum dot strip, which is received in the first retention slot; and
- a second quantum dot strip, which is received in the second retention slot.

12. The liquid crystal display device as claimed in claim 11, wherein the first retention slot and the second retention slot are arranged to be parallel to each other.

13. The liquid crystal display device as claimed in claim 11, wherein the first retention slot has an end contacting an inner end of a bottom of the first retention slot and the first retention slot has an opposite end that is flush with the light exit surface.

14. The liquid crystal display device as claimed in claim 11, wherein the second retention slot has an end contacting an inner end of a top of the second retention slot and the second retention slot has an opposite end that is flush with the bottom surface.

15. The liquid crystal display device as claimed in claim 11 further comprising a first reflection layer, wherein the first reflection film layer is arranged on a side of the intermediate frame that faces the backplane, the first reflection film layer having an end positioned against the sidewall, the first reflection film layer having an opposite end located between the intermediate frame and the light guide plate.

16. The liquid crystal display device as claimed in claim 11 further comprising a second reflection layer, wherein the second reflection film layer is arranged on a side of the backplane that faces the intermediate frame, the second reflection film layer having an end positioned against the sidewall.

17. The liquid crystal display device as claimed in claim 15 further comprising a light absorption layer, wherein the light absorption layer is arranged between the intermediate frame and the light guide plate and the light absorption layer has an end positioned against the opposite end of the first reflection film layer.

18. The liquid crystal display device as claimed in claim 11, wherein the backplane comprises a plurality of raised blocks formed on a side thereof that faces the light guide plate, wherein the light guide plate is positioned on the raised blocks.

19. The liquid crystal display device as claimed in claim 16 further comprising a reflector plate, wherein the reflector plate is arranged between the light guide and backplane and the reflector has an end positioned against an opposite end of the second reflection film layer.

20. The liquid crystal display device as claimed in claim 11 further comprising a reflector plate, wherein the reflector plate is arranged between the light guide plate and the backplane.

* * * * *